(12) United States Patent
Chiba

(10) Patent No.: US 10,885,939 B1
(45) Date of Patent: Jan. 5, 2021

(54) MAGNETIC DISK DEVICE AND READ ERROR RETRY METHOD FOR MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Hiroyuki Chiba, Kanagawa (JP)

(73) Assignees: KABUSHKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/808,241

(22) Filed: Mar. 3, 2020

(30) Foreign Application Priority Data

Aug. 29, 2019 (JP) ................................. 2019-157085

(51) Int. Cl.
*G11B 20/18* (2006.01)
*G11B 20/12* (2006.01)

(52) U.S. Cl.
CPC ...... *G11B 20/1816* (2013.01); *G11B 20/1217* (2013.01); *G11B 2020/1232* (2013.01); *G11B 2020/183* (2013.01)

(58) Field of Classification Search
CPC ..... G11B 5/00; G11B 20/10009; G11B 27/36; G11B 20/12; G11B 20/18; G11B 2020/183
USPC ............................. 360/25, 31, 39, 48, 53, 54
See application file for complete search history.

(56) References Cited

U.S. PATENT DOCUMENTS

| 7,072,137 | B2 | 7/2006 | Chiba |
| 7,948,699 | B2 | 5/2011 | Liu et al. |
| 8,281,226 | B2 | 10/2012 | Murayama et al. |
| 9,508,382 | B2 * | 11/2016 | Jun .................... G11B 20/1833 |

* cited by examiner

*Primary Examiner* — Nabil Z Hindi
(74) *Attorney, Agent, or Firm* — Kim & Stewart LLP

(57) ABSTRACT

A magnetic disk device includes a magnetic disk, a read head for reading data from sectors and tracks of the magnetic disk, a read channel including a first circuit configured to process an output signal from the read head according to a value of a parameter, and processor. The processor is configured to, upon detection of a read error while the read head is reading data from an error sector of an error track, determine an error amount in each sector in the error track, select from the error track a plurality of sectors having an error amount that is within a predetermined range from an error amount of the error sector, perform a training read on the selected sectors, determine a new value of the parameter based on the training read, and set the new value of the parameter for the read channel.

19 Claims, 10 Drawing Sheets

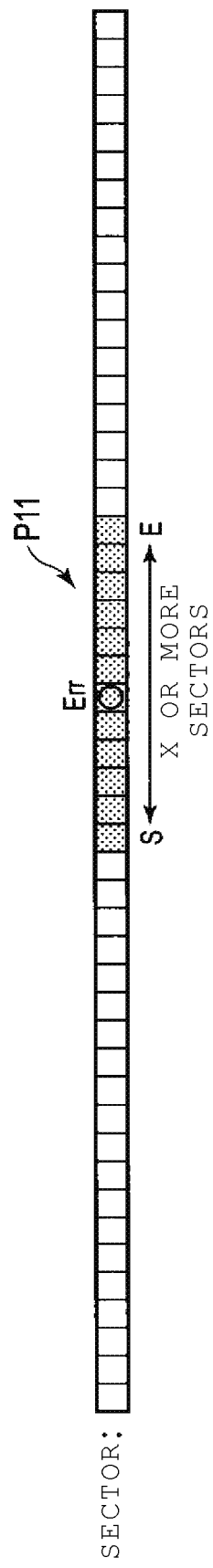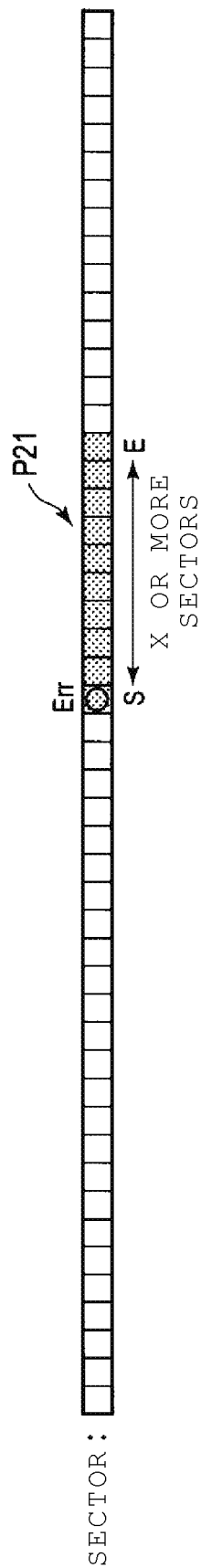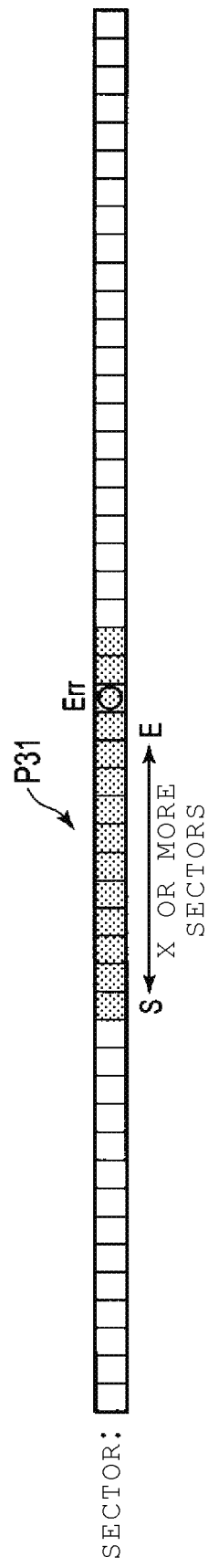

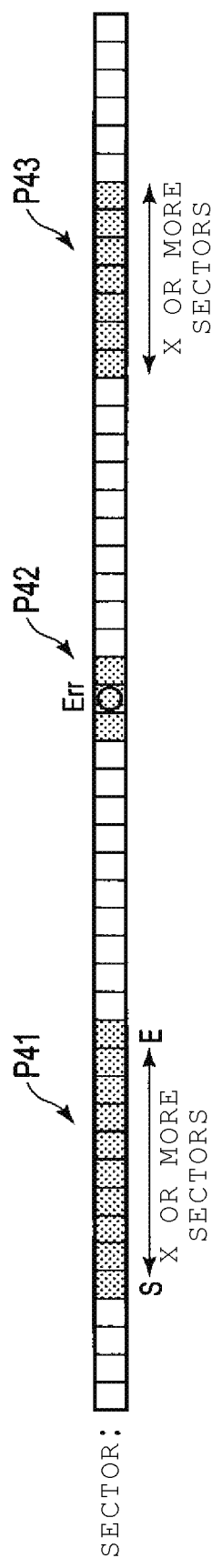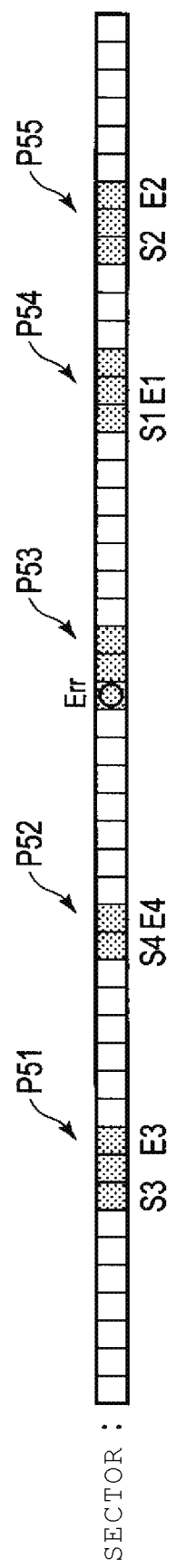

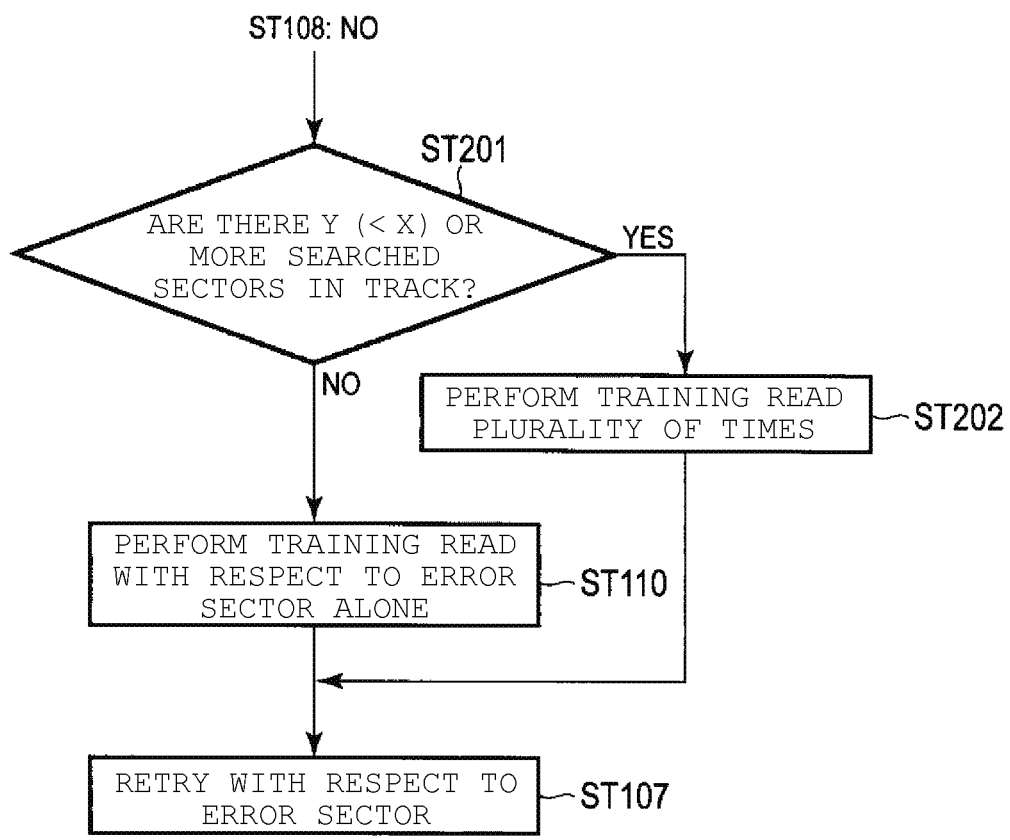

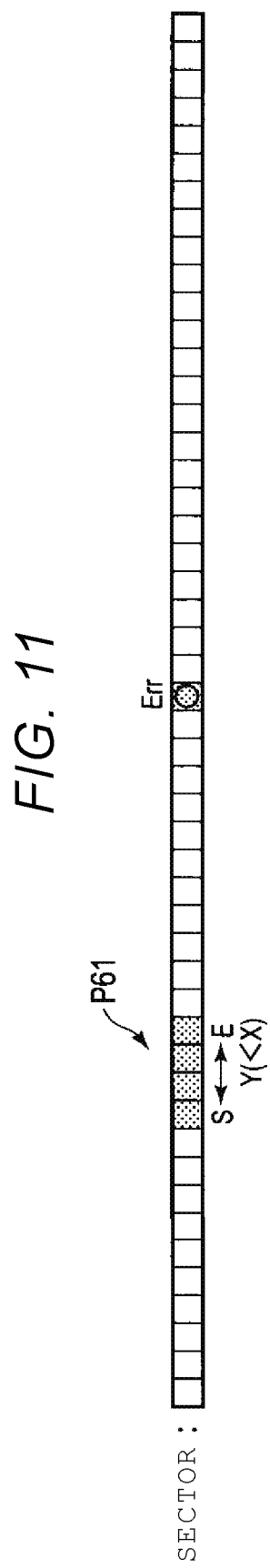

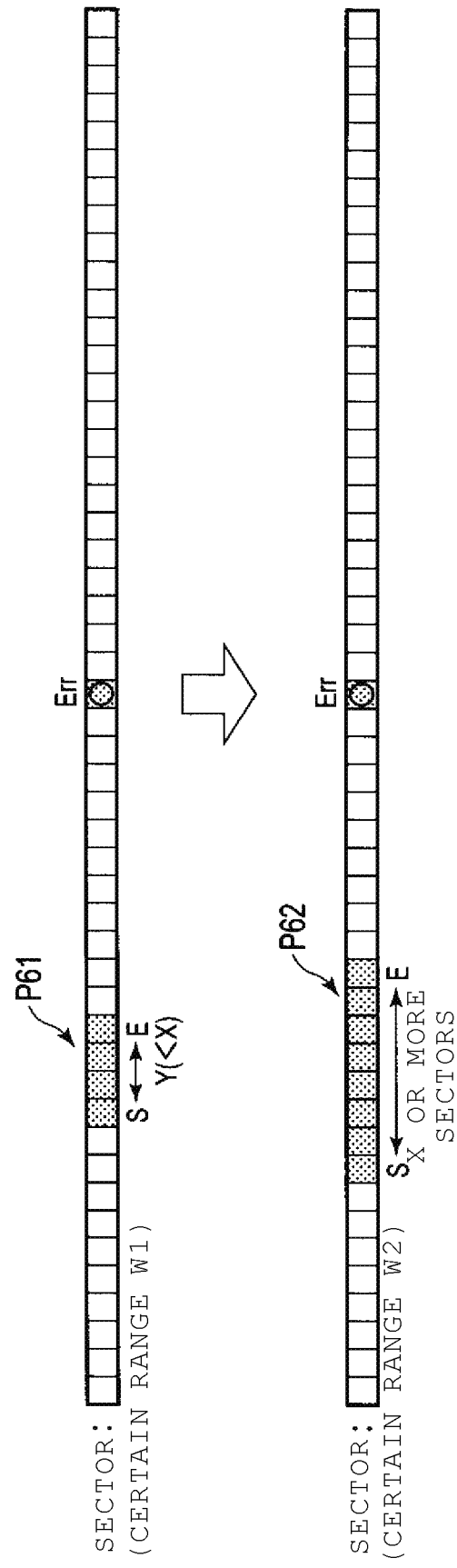

MAGNETIC DISK DEVICE AND READ ERROR RETRY METHOD FOR MAGNETIC DISK DEVICE

CROSS-REFERENCE TO RELATED APPLICATION(S)

This application is based upon and claims the benefit of priority from Japanese Patent Application No. 2019-157085, filed Aug. 29, 2019, the entire contents of which are incorporated herein by reference.

FIELD

Embodiments described herein relate generally to a magnetic disk device and a read error retry method for the magnetic disk device.

BACKGROUND

Compared to normal sectors, sectors affected by drift off write (DOW), adjacent track interference (ATI), and the like may cause decrease in signal output, increase in noise, center deviation, and the like, and when data is read from such sectors, a read error is likely to occur. Generally, parameters used for various processes for read channels and the like are adjusted to the optimum values for each magnetic head and zone before shipment. On the other hand, the state of the error sector is considerably different from the initial state as described above, and thus the optimized parameters no longer work for the error sector.

Therefore, a read error retry is attempted on the error sector after varying the optimized parameters or re-adjusting the parameters using the error sector itself. In particular, the latter method is very effective and results in a high error recovery rate by re-learning, mainly using the error sector, parameters for a pattern-dependent noise correction function, such as finite impulse response filter (FIR) and data dependent noise predictive (DDNP) Viterbi detection in the read channel.

DESCRIPTION OF THE DRAWINGS

FIGS. 5-9 are each a diagram illustrating a specific example when a sector having a BER value within a certain range from a BER value of an error sector is detected, according to the first embodiment;

FIG. 10 is a flowchart showing read error retry processing according to a second embodiment;

FIG. 11 is a diagram illustrating a situation in which there is no succession of X or more sectors but there are Y or more sectors present in the same track without X or more sectors in the second embodiment;

FIG. 13 is a diagram illustrating a situation in which a sector having a BER value within a certain range from a BER value of an error sector is detected, according to the third embodiment.

DETAILED DESCRIPTION

Figure 1:
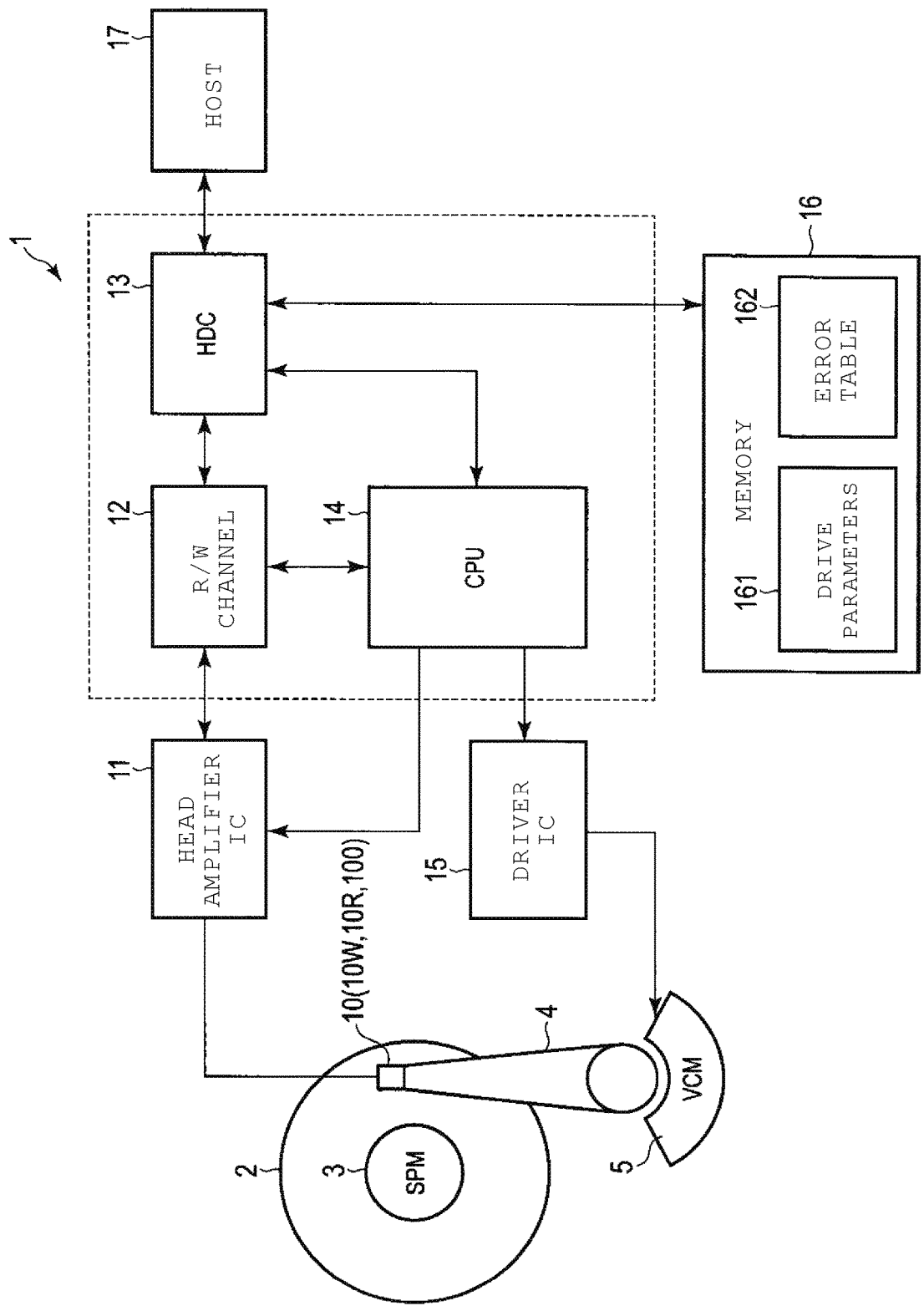
FIG. 1 is a diagram showing a configuration of a magnetic disk device according to a first embodiment.

Embodiments provide a magnetic disk device capable of efficiently re-learning parameters and minimizing retry times, and a read error retry method for the magnetic disk device.

According to one embodiment, there is provided a magnetic disk device including a magnetic disk, a read head for reading data from sectors and tracks of the magnetic disk, wherein each of the tracks includes a plurality of sectors, a read channel including a first circuit configured to process an output signal from the read head according to a value of a parameter, and processor. The processor is configured to, upon detection of a read error while the read head is reading data from an error sector of an error track, determine an error amount in each of a plurality of sectors in the error track, select from the error track a plurality of sectors having an error amount that is within a predetermined range from an error amount of the error sector, perform a training read on the selected sectors, determine a new value of the parameter based on results of the training read, and set the new value of the parameter for the read channel.

Hereinafter, embodiments will be described with reference to the drawings. The disclosure is merely an example, and the present disclosure is not limited by the contents described in the following embodiments. It goes without saying that variations readily conceivable by those skilled in the art are included in the scope of the disclosure. For clarity of explanation, in the drawings, the size, shape, and the like of each part may be schematically expressed by changing the actual embodiment. In the plurality of drawings, corresponding elements may be denoted by the same reference numerals and detailed description may be omitted.

First Embodiment

FIG. 1 is a diagram showing a configuration of a magnetic disk device 1 according to the first embodiment. As shown in FIG. 1, the magnetic disk device 1 is a hard disk drive (HDD), for example. The magnetic disk device 1 includes a magnetic disk 2, a spindle motor (SPM) 3, an actuator 4, a voice coil motor (VCM) 5, a magnetic head 10, a head amplifier IC 11, a R/W channel 12, a hard disk controller (HDC) 13 that is a control unit, a central processing unit (CPU) 14, a driver IC 15, and a memory 16.

The magnetic disk device 1 may be connectable to a host computer 17. The magnetic head 10 includes a write head 10W, a read head 10R, and a spin-torque-oscillator (STO) 100 that is a high-frequency oscillation element. The R/W channel 12, the HDC 13, and the CPU 14 may be incorporated into a one-chip integrated circuit.

The magnetic disk 2 includes a substrate made of a non-magnetic material and formed in a disk shape, for example. Each surface of the substrate is stacked with a soft magnetic layer made of a material exhibiting soft magnetic properties as an underlayer, a magnetic recording layer having magnetic anisotropy in a direction perpendicular to the disk surface on an upper layer thereof, and a protective film layer on an upper layer thereof, in the order described. Here, the upper layer is a layer closer to the magnetic head 10.

The magnetic disk 2 is fixed to a spindle motor (SPM) 3 and is rotated at a predetermined speed by the SPM 3. The magnetic disk 2 is not limited to one, and a plurality of magnetic disks 2 may be attached to the SPM 3. The SPM 3 is driven by a drive current or drive voltage supplied from the driver IC 15. A data pattern is recorded in and reproduced from the magnetic disk 2 by the magnetic head 10.

The actuator 4 is rotatable and has the magnetic head 10 supported on a tip portion thereof. When the actuator 4 is rotated by the VCM 5, the magnetic head 10 is moved and positioned to a desired track of the magnetic disk 2. The VCM 5 is driven by a drive current or drive voltage supplied from the driver IC 15.

The magnetic head 10 includes a slider, the write head 10W formed on the slider, the spin-torque-oscillator 100, and the read head 10R. A plurality of magnetic heads 10 are provided corresponding to the number of magnetic disks 2.

The head amplifier IC 11 includes a recording coil control unit, a reproduction signal detection unit, and a heater control unit. The head amplifier IC 11 supplies, to the write head 10W, a write signal (i.e., write current) in accordance with the write data supplied from the R/W channel 12. The head amplifier IC 11 amplifies the read signal output from the read head 10R and transmits it to the R/W channel 12. The recording coil control unit controls the recording current supplied to the coil of the write head 10W in accordance with the write signal. The reproduction signal detection unit detects a signal reproduced by the read head 10R (i.e., read data). The heater control unit controls power supply to the read heater provided in the read head 10R and the write heater provided in the write head 10W. That is, the heater control unit switches the ON/OFF state of the heater.

The R/W channel 12 is a signal processing circuit that processes the signals related to reading/writing. The R/W channel 12 includes a read channel that preforms signal processing of read data and a write channel that preforms signal processing of write data. The R/W channel 12 converts the read signal into digital data and demodulates the digital data into the read data. A detailed example of the read channel will be described below with reference to FIG. 2. Further, the R/W channel 12 encodes the write data transmitted from the HDC 13 and transmits the encoded write data to the head amplifier IC 11.

The HDC 13 controls data writing to the magnetic disk 2 and data reading from the magnetic disk 2 through the magnetic head 10, the head amplifier IC 11, and the R/W channel 12. The HDC 13 is an interface between the magnetic disk device 1 and the host 17 and performs transmission control of the read data and the write data. That is, the HDC 13 serves as a host interface controller that receives a signal transmitted from the host 17 and transmits a signal to the host 17. When transmitting a signal to the host 17, the HDC 13 performs an error correction processing with respect to the data of the reproduction signal read and demodulated by the magnetic head 10 according to instructions from the CPU 14. Further, the HDC 13 receives a command transmitted from the host 17 (e.g., write command, read command, and the like) and transmits the received command to the CPU 14.

The CPU 14 is amain controller of the magnetic disk device and executes servo control necessary for controlling read/write operations and positioning the magnetic head 10.

The driver IC 15 controls driving of the SPM 3 and the VCM 5 according to the control of the CPU 14. When the VCM 5 is driven, the magnetic head 10 is located at a target track on the magnetic disk 2.

The memory 16 includes a volatile memory and a non-volatile memory. For example, the memory 16 includes a buffer memory formed of a DRAM and a flash memory. The memory 16 stores programs and parameters necessary for the processing executed by the CPU 14. The memory 16 stores drive parameters 161 and an error table 162. The drive parameters 161 are set in a signal processing circuit that processes a read signal received by the read channel of the R/W channel 12 from the head amplifier IC 11. More specifically, the drive parameters 161 are set in each circuit of a read channel 12a of FIG. 2, which is described below. The error table 162 indicates a method of retrying read of the data when a read error occurs and the priority thereof. For example, the error table 162 sets a read error retry using re-read as priority 1, offset read as priority 2, and training read according to the present embodiment as priority 3. The data retry method and its priority may be set as desired.

Here, the training read will be described. While the training read is effective when reading data from an error sector, the following situations are also assumed. First, several tens to several hundred sectors are usually required to learn the parameters set in each circuit of the read channel 12a using the training read. For this reason, for example, when there is only one error sector, the learning is performed based only on one sector per rotation of the magnetic disk, and under such circumstances, it takes a considerable amount of time to complete the learning process. Next, when influenced by DOW and ATI, it is often the case that a plurality of sectors before and after the error sector are also in the same state as the error sector. In such a case, the parameters may be re-learned efficiently by performing training read with respect to the range including the sectors before and after the error sector, so that the retry time is minimized. However, the number of sectors suitable for the training read and the location at which such sectors are present are varied case-by-case, and in order to recover an error sector, it is necessary to try training read at various timings and the number of sectors, which still requires a considerable amount of time. Here, in general, in a magnetic disk device, a timeout time is set for each command. For this reason, when the time for learning the parameters reaches the timeout time, the retry is aborted and "uncorrectable" is reported to the host. In such a case, there is also the possibility of data being lost. Therefore, when performing training read, it is important to appropriately search a target sector of the training read. The method for searching a target sector for the training read according to the present embodiment will be described in detail with reference to FIG. 3.

Figure 2:
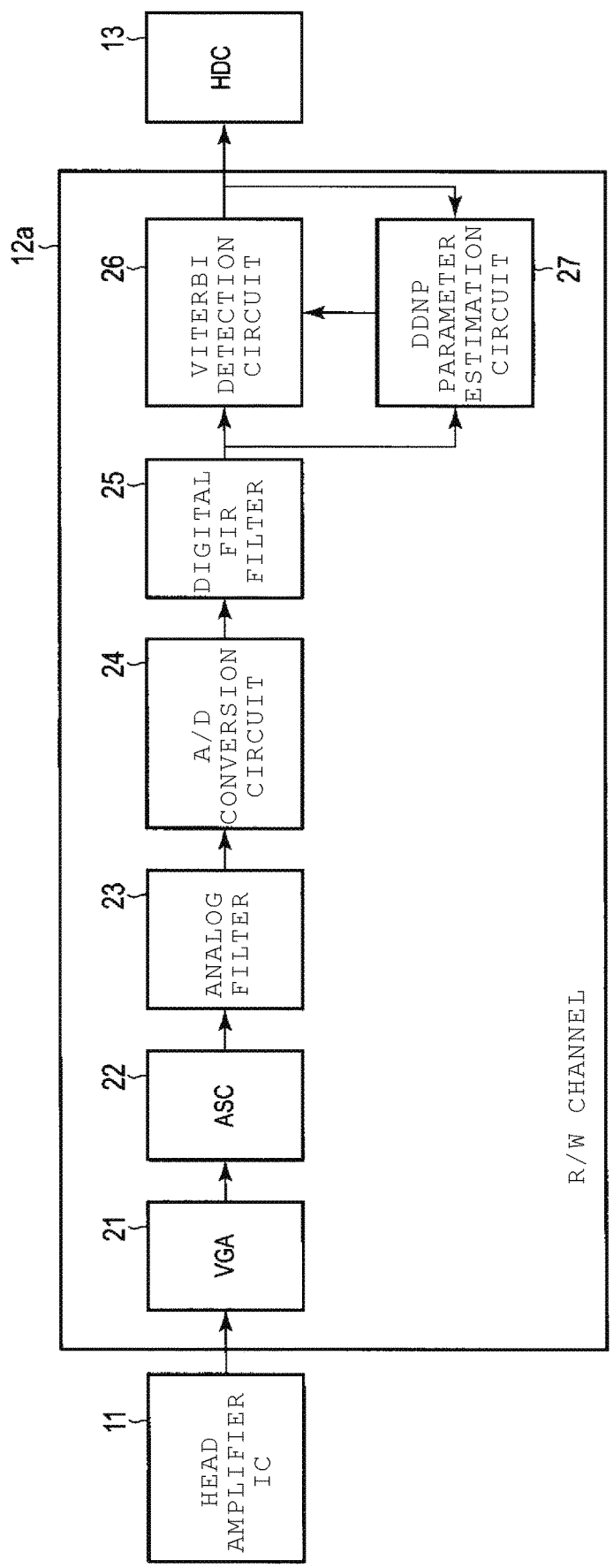
FIG. 2 is a diagram showing a configuration of a read channel of a R/W channel according to the first embodiment.

FIG. 2 is a diagram showing a configuration of the read channel 12a of the R/W channel 12.

As shown in FIG. 2, the read channel 12a includes a variable gain amplifier (VGA) 21, an asymmetry correction (ASC) 22, an analog filter 23, an A/D conversion circuit 24, and a digital finite impulse response (FIR) filter 25, a Viterbi detection circuit 26, and a data dependent noise predictive (DDNP) parameter estimation circuit 27 as the signal processing circuits. The signal output from the head amplifier IC 11 passes through the VGA 21, the ASC 22, the analog filter 23, the A/D conversion circuit 24, and the digital FIR filter 25 to the Viterbi detection circuit 26 and the DDNP parameter estimation circuit 27. Further, the signal output from the Viterbi detection circuit 26 is output to the HDC 13 and the DDNP parameter estimation circuit 27. The DDNP parameter estimation circuit 27 processes the input from the digital FIR filter 25 and the input from the Viterbi detection circuit 26 and outputs the processed result to the Viterbi detection circuit 26.

The VGA 21 is an amplifier circuit that amplifies a signal input to the read channel 12a from the head amplifier IC 11. The ASC 22 is a circuit that corrects vertical asymmetry of the waveform. The analog filter 23 is a circuit that filters an analog signal. The A/D conversion circuit 24 is a circuit for analog/digital conversion. The digital FIR filter 25 is a digital filter or an equalizer. The analog filter 23 and the digital FIR filter 25 equalize the input waveform. The Viterbi detection circuit 26 is a circuit that processes a Viterbi algorithm. The DDNP parameter estimation circuit 27 is a circuit that performs the Viterbi algorithm and estimates a signal sequence closest to the information source signal based on an input that may contain an error, and predicts a noise correlation for each input data pattern and randomizes noise. In the present embodiment, the Viterbi detection circuit 26 and the DDNP parameter estimation circuit 27 are separated. Alternatively, the Viterbi detection circuit 26 may include the function of the DDNP parameter estimation circuit 27.

The drive parameters 161 described above are set in the VGA 21, the ASC 22, the analog filter 23, the A/D conversion circuit 24, the digital FIR filter 25, the Viterbi detection circuit 26, and the DDNP parameter estimation circuit 27, for example, and when a read command is received from the host 17, the HDC 13 transmits the read command to the CPU 14. The CPU 14 reads the parameters set in advance in accordance with the position of the magnetic head 10 and the magnetic disk specified by the read command from the drive parameters 161, and sets the read parameters to the VGA 21, the ASC 22, the analog filter 23, and the A/D conversion circuit 24, the digital FIR filter 25, the Viterbi detection circuit 26, and the DDNP parameter estimation circuit 27. After the parameters are set in the read channel 12a in this way, based on the read command, the data read is performed by the HDC 13.

Next, processing performed when the HDC 13 detects a read error will be described. In the present embodiment, when the HDC 13 detects a read error, the HDC 13 performs re-read of the data because re-read is defined as priority 1 in the error table 162. That is, the data read is performed with the same parameters again. For example, in certain cases, when the moving distance of the magnetic head 10 is long, vibration may occur due to the movement, and a read error may occur due to the vibration. In such cases, since the read error may be eliminated by re-read, re-read is performed first.

When a read error is detected even after re-read, since the offset read is defined as priority 2 in the error table 162, the HDC 13 performs data read, by shifting the read head position and the threshold of the RDC (direct current resistance) parameter. For example, the HDC 13 offsets the parameters set in the VGA 21, the ASC 22, the analog filter 23, the A/D conversion circuit 24, the digital FIR filter 25, the Viterbi detection circuit 26, and the DDNP parameter estimation circuit 27 by a preset amount, and then performs the data read again.

Figure 3:
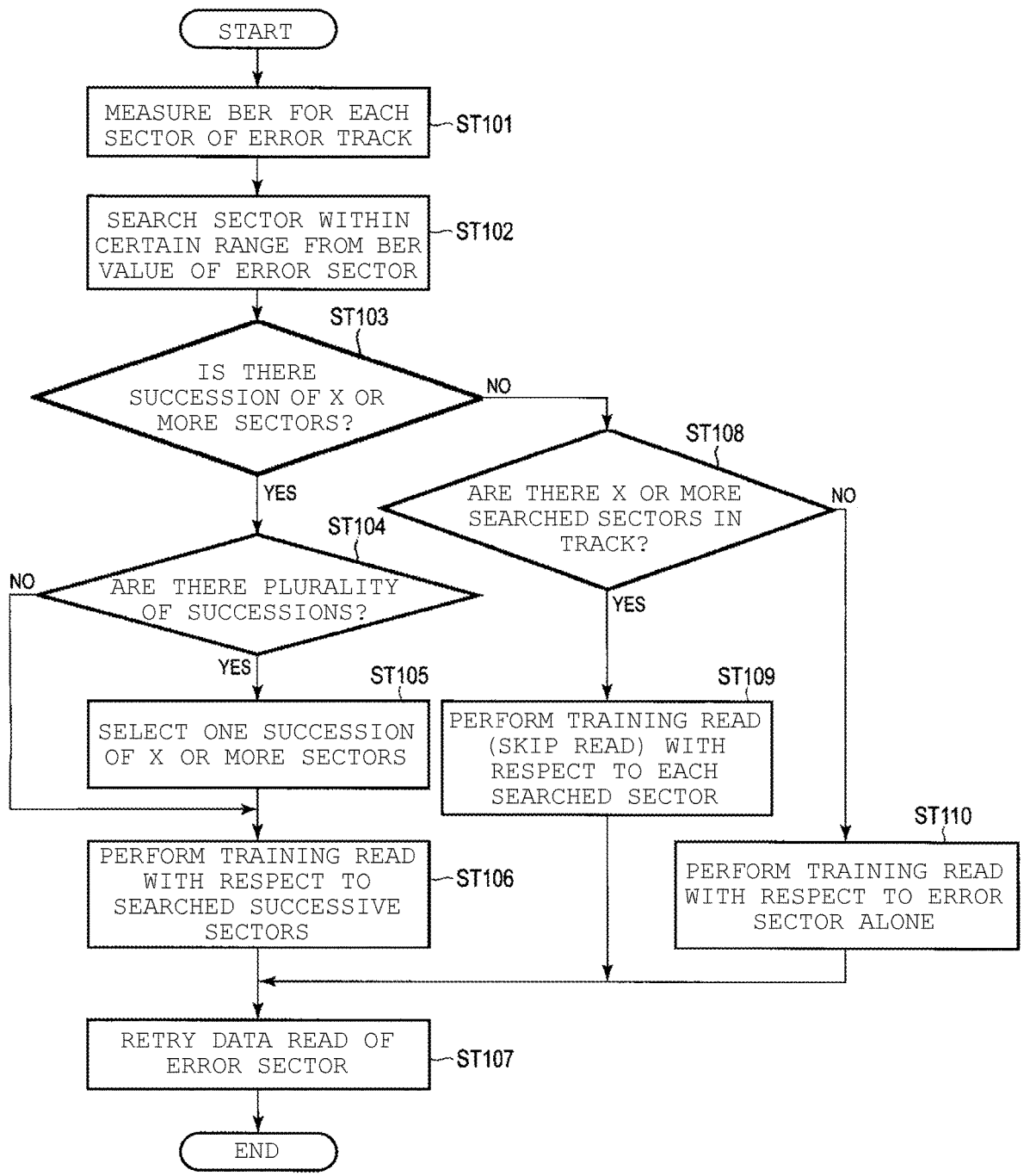
FIG. 3 is a flowchart showing read error retry processing according to the first embodiment.

When a read error is detected even after the offset, the HDC 13 performs the read error retry according to the present embodiment as the read data retry is defined as priority 3 in the error table 162. FIG. 3 is a flowchart showing an example of read error retry processing. In the present embodiment, before performing the following processing, the offsets made by the processing described above are restored.

Figure 4:
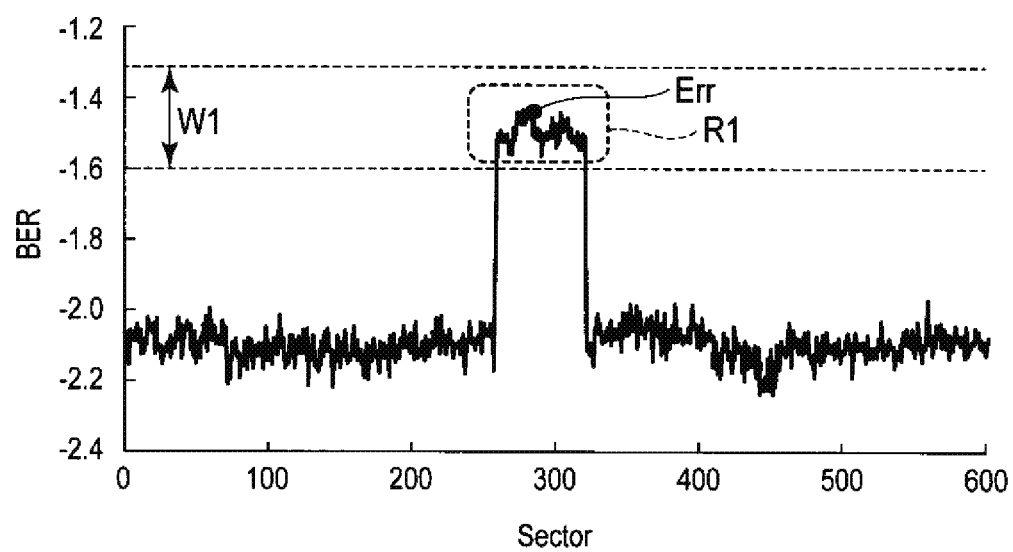
FIG. 4 is a diagram showing a result of measuring a bit error rate (BER) for each sector of an error track according to the first embodiment.

As shown in FIG. 3, the HDC 13 first measures a BER for each sector of an error track having a sector in which an error is detected (ST101). FIG. 4 is a diagram showing a result of measuring the BER for each sector of the error track. The horizontal axis indicates each sector (0 to 600), and the vertical axis indicates the value of the BER. Further, the Err indicates sectors in which an error occurred.

Next, the HDC 13 searches for sectors whose BER values fall within a certain range W1 from the BER value of the error sector (ST102). Specifically, the HDC 13 first acquires the BER value of the error sector Err, and searches for a sector having a BER value within the certain range W1 from the acquired BER value. In this example, it is assumed that the certain range W1 is set in advance. FIG. 4 shows a case where the sector range R1 includes a succession of sectors from about sector 270 to about sector 320 in the certain range W1.

Next, the HDC 13 determines whether there is a succession of X or more sectors based on the sectors searched within the certain range W1 (ST103). Here, X is any number of sectors set in advance, and is set to 50 sectors in the present embodiment. Therefore, in the example shown in FIG. 4, since 50 sectors or more are consecutively included in the sector range R1, it is determined that there is a succession of X or more sectors.

When it is determined that there is a succession of X or more sectors (ST103: YES), the HDC 13 determines whether there are a plurality of successions of X or more sectors (ST104). In the example shown in FIG. 4, since there is one succession of X or more sectors, it is determined as NO. When it is determined that there are a plurality of successions of X or more sectors (ST104: YES), the HDC 13 selects one succession of X or more sectors according to priority (ST105). In this example, the priority is predetermined and stored in the memory 16. The priority will be described below with reference to FIG. 8.

When selecting one succession of X or more sectors (ST105), or when determining in step ST104 that there is no plurality of successions of X or more sectors (ST104: NO), the HDC 13 performs training read with respect to the searched consecutive sectors (i.e., succession of X or more sectors) (ST106). Thereby, based on the result of the training read, the parameters set in the read channel 12a follow and vary. More specifically, the parameters set in the VGA 21, the ASC 22, the digital FIR filter 25, and the DDNP parameter estimation circuit 27 follow and vary. In general, since the parameters set in the VGA 21 and the ASC 22 are fast to follow, if the training read is performed with respect to one to several sectors, the tracking is sufficient. Meanwhile, since the parameters set in the digital FIR filter 25 and the DDNP parameter estimator 27 are slow to follow, the training read may need to be performed with respect to several tens to several hundreds of sectors. For this reason, in this embodiment, the value of consecutive sectors is set to X (e.g., 50 sectors). The parameters of the analog filter 23, the A/D conversion circuit 24, and the Viterbi detection circuit 26 are not varied even when the training read is performed, and the set parameters remain as they are.

Thus, after the parameters set in each circuit of the read channel 12a (i.e., the VGA 21, the ASC 22, the digital FIR filter 25, and the DDNP parameter estimation circuit 27) are varied, the HDC 13 retries the data read of the error sector (ST107). As a result, training read using the sectors, which have BER values within the certain range W1 from the error sector Err, and which are a succession of X or more sectors, may be performed and after the parameters set in each circuit of the read channel 12a are varied, the magnetic disk device 1 may perform the data read of the error sector Err.

When it is determined in step ST103 that there is no succession of X or more sectors (ST103: NO), the HDC 13 determines whether there are X or more sectors searched in the track (ST108). When it is determined that there are X or more sectors (ST108: YES), the HDC 13 performs training read with respect to each searched sector (ST109). In this training read, the HDC 13 may not read sectors between the target sectors (i.e., skip read), for example, between P51 and P52 in the example of FIG. 9. As a result, the training read with respect to the sectors, which have BER values within the certain range W1 from the error sector Err, and which are the X or more sectors, may be performed, and after the parameters set in each circuit of the read channel 12a are varied, the magnetic disk device 1 may perform the data read of the error sector Err.

Meanwhile, when it is determined in step ST108 that there are no X or more sectors (ST108: NO), the HDC 13 performs the training read with respect to the error sector Err alone (ST110). In this case, since there is only one error sector Err as a sector subjected by training read, it is necessary to perform the training read with respect to the error sector Err by rotating the magnetic disk 2 a plurality of times (e.g., 50 times) in order to achieve the same accuracy as the case described above).

Next, a specific example when detecting a sector having a BER value within a certain range W1 from the BER value of an error sector will be described with reference to FIGS. 5 to 10. The arrangement of sectors in a track is schematically shown in FIGS. 5 to 10. In addition, the sectors with the BER values within the certain range W1 from the BER value of the error sector Err are indicated by hatching. The circle in the illustration indicates the error sector Err, and on the left of the illustration, there is the leading sector for reading.

FIG. 5 is a diagram showing an example when there is a sector group P11 including a succession of X or more sectors (i.e., sectors S to E), with an error sector Err present in the center. In this case, the HDC 13 performs the training read with respect to the sectors of the sector group P11, follows and varies the parameters of the first circuit group of the read channel 12a, and then retries read of the error sector in the next round.

FIG. 6 is a diagram showing an example when there is a sector group P21 including a succession of X or more sectors (i.e., sectors S to E), with the error sector Err present in the leading sector S of the sector group P21. In this case, as in the case of FIG. 5, the HDC 13 performs the training read with respect to the sectors of the sector group P11, follows and varies the parameters of the first circuit group of the read channel 12a, and then retries the read of the error sector in the next round.

FIG. 7 is a diagram showing an example when there is a sector group P31 including a succession of X or more sectors, with the error sector Err located in the rear end side of the sector group P31 (i.e., in the vicinity of the sector E), and with a succession of X or more sectors present toward the leading side from the error sector Err. In this case, the HDC 13 performs the training read from the sector S to the sector E of the sector group P31, follows and varies the parameters of the first circuit group of the read channel 12a, and then retries the read of the error sector without waiting for the next round.

FIG. 8 is a diagram showing an example when a sector group P42 including the error sector Err does not have a succession of X or more sectors, while there are a plurality of successions of X or more sectors (i.e., sector group P41 and sector group P43) present apart from the sector group P42. As shown in FIG. 8, the sector group P41 is located closer to the leading side than the sector group P42 including the error sector Err, and the sector group P43 is located closer to the rear side than the sector group P42. As described above, when there are a plurality of successions of X or more sectors, the HDC 13 selects the sector group by giving a priority to the sector group on the leading side. In the example shown in FIG. 8, the sector group P41 is selected. Therefore, the HDC 13 performs the training read from the sector S to the sector E of the sector group P41, follows and varies the parameters of the first circuit group of the read channel 12a, and then performs the read of the error sector Err. In this way, by selecting the sector group P41 on the leading side of the error sector Err as the target of the training read, it is possible to retry the read of the error sector Err without waiting for the next round.

FIG. 9 is a diagram showing an example when there is no succession of X or more sectors, but there are X or more sectors in the same track. As shown in FIG. 9, there is no succession of X or more sectors. Meanwhile, a sector group P53 including an error sector Err is shown, with a sector group P51 (i.e., sectors S3 to E3) and a sector group P52 (i.e., sectors S4 to E4) shown on the leading side thereof, and a sector group P54 (i.e., sectors S1 to E1) and a sector group P55 (i.e., sector S2 to sector E2) shown on the rear side thereof. The sum of the number of sectors of the sector groups P54, P55, P51, and P52 in total is X or more. In this case, the HDC 13 performs training read in the order of the sector group P54, the sector group P55, the sector group P51, and the sector group P52, follows and varies the parameters of the first circuit group of the read channel 12a to follow, and then retries the read of the error sector without waiting for the next round.

When detecting a read error from the output from the read channel 12a, the magnetic disk device 1 described above searches optimum sectors for the training read (as described above, succession of X or more sectors, X or more sectors) in order to set parameters of the read channel 12a before reading data again from the error sector from which the read error is detected. Then, the training read is performed with respect to the searched sectors, the parameters of the first circuit group in the read channel 12a are varied by the training read, and the error sector Err is read again. For this reason, the magnetic disk device 1 can perform training using a sector that is likely to be in the same state as the error sector Err, and can learn parameters before timeout. Therefore, the parameters can be re-learned efficiently, and the retry time can be minimized. In addition, it is possible to reduce the possibility that data will be lost due to timeout.

Second Embodiment

When it is determined that there are no X or more sectors (ST108: NO) as described above, for example, in order to perform the training read with respect to the error sector Err 50 times with the method of performing the training read with respect to the error sector Err (ST110), it is necessary to rotate the magnetic disk 2 for 50 times, which may take a long time and even reaching the timeout. The second embodiment is different from the first embodiment in that, in order to avoid such a situation, the number of times of training reads to be performed is increased when the X or more sectors are not searched. The same components as those in the first embodiment are denoted by the same reference numerals.

FIG. 10 is a flowchart showing processing added to the retry processing with respect to the read error of FIG. 3 described above. In the present embodiment, since the processing of steps ST201 and ST202 is added to the case when it is NO at step ST108 of FIG. 3, the processing of steps ST201 and ST202 will be described.

When it is determined that there are no X or more sectors in the track (ST108: NO), the HDC 13 determines whether there are Y or more sectors searched in the track (ST201). Here, Y is a value smaller than X, e.g., 25. FIG. 11 is a diagram showing an example when there is no succession of X or more sectors, and there are no X or more sectors in the same track, but there is a sector group P61 of Y or more sectors. When it is determined that there are no Y or more sectors (ST201: NO), the HDC 13 proceeds to the processing of step ST110 described above.

Meanwhile, when it is determined that there are Y or more sectors (ST201: YES), the HDC 13 sets the number of times of training reads to be performed to a plurality of times (ST202). For example, when Y is 25, the number of times of training reads is set to two. This makes it possible to perform the training read with respect to 50 sectors. That is, the number of times of performing the training read may be varied in accordance with the number of sectors of which the BER value is within the certain range W1, and may be set such that the number of searched sectors multiplied by the number of times of training reads exceeds the number of X sectors described above. After the number of times of the training reads is set, the training read is performed a plurality of times with respect to the sector group P61 of which the BER value is in the certain range W1, so that the HDC 13 follows and varies the parameters of the first circuit group in the read channel 12a (i.e., VGA 21, ASC 22, digital FIR filter 25, and DDNP parameter estimation circuit 27), and then retries read of the error sector (ST110).

As described above, by setting the number of times of the training reads to a plurality of times, the magnetic disk device 1 may achieve the same effect as that in the first embodiment even when the number of the sector having a BER value within the certain range W1 from the BER value of the error sector Err in the track is smaller than that of the first embodiment. That is, the magnetic disk device 1 can efficiently re-learn parameters and reduce the retry time. In addition, it is possible to reduce the possibility that data will be lost due to timeout.

Third Embodiment

The third embodiment is different from the second embodiment in that, when the X or more sectors are not searched, the number of searched sectors is increased by expanding the range of the certain range W1. The same components as those in the first embodiment are denoted by the same reference numerals.

Figure 12:
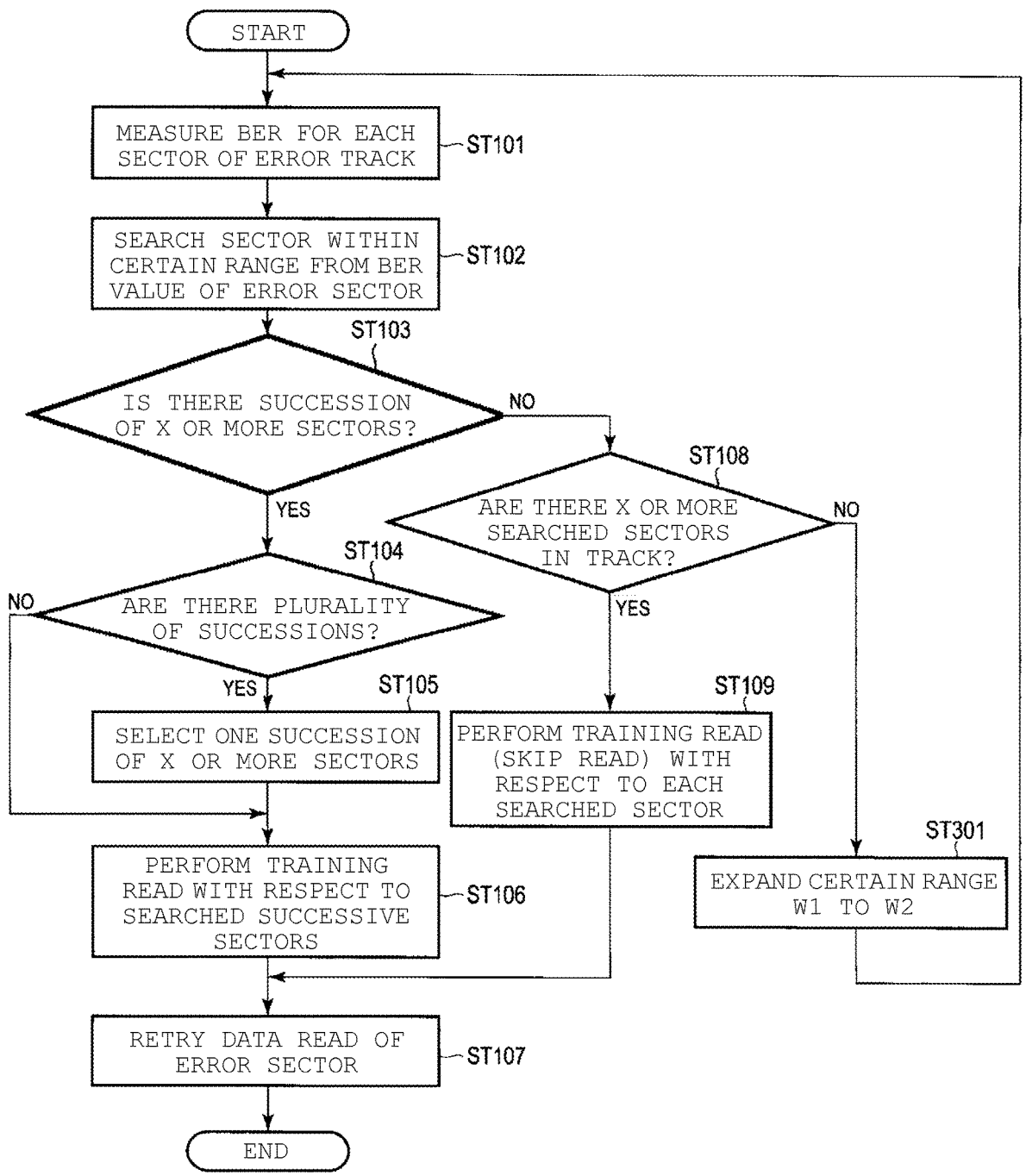
FIG. 12 is a flowchart showing read error retry processing, according to a third embodiment.

FIG. 12 is a flowchart showing processing added to the retry processing with respect to the read error of FIG. 3 described above. In the present embodiment, since the processing of step ST301 is added to the case when it is NO at step ST108 of FIG. 3, the processing of step ST301 will be described.

When it is determined that the number of the searched sectors is less than X in the track (ST108: NO), the HDC 13 expends the certain range W1 to W2 (>W1) (ST301). Then, the processing returns to step ST101. Thus, by expanding the certain range W1 to the certain range W2, it is possible to increase the number of sectors having a BER value within the certain range W2 from the BER value of the error sector Err, that is, to increase the number of searched sectors. FIG. 13 is a diagram showing an example of comparing the numbers of sectors searched in the certain range W1 and the certain range W2. In the case of the certain range W1 on the upper half of FIG. 13, even when the number of sectors searched is Y (<X), by expanding to the certain range W2, the number of sectors searched is X in the case of the certain range W2 on the lower half of FIG. 13. In the present embodiment, the case is described in which, after expansion to the certain range W2, processing returns to the processing of step ST101 where the BER value of the sectors in the track is measured again. Alternatively, when the BER value measured in the certain range W1 is stored (ST101), the BER value may be used for searching the sectors having a BER value in the certain range W2.

As described above, by expanding the certain range W1 to the certain range W2, the magnetic disk device 1 can achieve the same effect as that in the first embodiment. That is, the magnetic disk device 1 can efficiently re-learn parameters and reduce the retry time. In addition, it is possible to reduce the possibility that data will be lost due to timeout.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a read head for reading data from sectors and tracks of the magnetic disk, wherein each of the tracks includes a plurality of sectors;
a read channel including a first circuit configured to process an output signal from the read head according to a value of a parameter; and
a processor configured to
upon detection of a read error while the read head is reading data from an error sector of an error track, determine an error amount in each of a plurality of sectors in the error track,
select from the error track a plurality of sectors having an error amount that is within a predetermined range from an error amount of the error sector, and
perform a training read on the selected sectors, determine a new value of the parameter based on results of the training read, and set the new value of the parameter for the read channel.

2. The magnetic disk device according to claim 1, wherein the selected sectors are consecutive sectors in the error track and the read head executes a re-read of the error sector after executing the training read on the consecutive sectors and setting the new value of the parameter for the read channel.

3. The magnetic disk device according to claim 1, wherein the selected sectors are consecutive sectors in the error track and the read head executes a re-read of the error sector prior to executing the training read on the consecutive sectors and setting the new value of the parameter for the read channel.

4. The magnetic disk device according to claim 1, wherein the selected sectors are non-consecutive sectors.

5. The magnetic disk device according to claim 1, wherein the processor is configured to select the sectors in the error track in the following order of priority:
first, at least a first predetermined number of consecutive sectors;

second, at least the first predetermined number of non-consecutive sectors; and third, a second predetermined number of non-consecutive sectors, that is less than the first predetermined number.

6. The magnetic disk device according to claim 1, wherein the processor is configured to increase the predetermined range upon determining that a number of consecutive sectors in the selected sectors is less than a threshold number.

7. The magnetic disk device according to claim 1, wherein the selected sectors include a first group of consecutive sectors and a second group of consecutive sectors and the processor is configured to select one of the first and second groups of consecutive sectors based on a preset priority.

8. The magnetic disk device according to claim 7, wherein when the first group of consecutive sectors is positioned before the second group of consecutive sectors within the track, the processor selects the first group of consecutive sectors.

9. The magnetic disk device according to claim 1, wherein the read channel includes a second circuit configured to process an output signal from the read head according to a preset value of the parameter even after the new value has been determined based on the training read.

10. A read error retry method for a magnetic disk device that includes a read head for reading data from sectors and tracks of a magnetic disk, wherein each of the tracks includes a plurality of sectors, and a read channel including a first circuit configured to process an output signal from the read head according to a value of a parameter, the method comprising:

upon detection of a read error while the read head is reading data from an error sector of an error track, determining an error amount in each of a plurality of sectors in the error track;

selecting from the error track a plurality of sectors having an error amount that is within a predetermined range from an error amount of the error sector;

performing a training read on the selected sectors;

determining a new value of the parameter based on results of the training read; and setting the new value of the parameter for the read channel.

11. The method according to claim 10, wherein the selected sectors are consecutive sectors in the error track.

12. The method according to claim 11, further comprising:

re-reading the error sector after executing the training read on the consecutive sectors and setting the new value of the parameter for the read channel.

13. The method according to claim 11, further comprising:

re-reading the error sector prior to executing the training read on the consecutive sectors and setting the new value of the parameter for the read channel.

14. The method according to claim 10, wherein the selected sectors are non-consecutive sectors.

15. The method according to claim 10, wherein said selecting the sectors in the error track is performed based on the following order of priority:

first, at least a first predetermined number of consecutive sectors;

second, at least the first predetermined number of non-consecutive sectors; and third, a second predetermined number of non-consecutive sectors, that is less than the first predetermined number.

16. The method according to claim 10, further comprising:

increasing the predetermined range upon determining that a number of consecutive sectors in the selected sectors is less than a threshold number.

17. The method according to claim 10, wherein the selected sectors include a first group of consecutive sectors and a second group of consecutive sectors and the processor is configured to select one of the first and second groups of consecutive sectors based on a preset priority.

18. The method according to claim 17, further comprising:

when the first group of consecutive sectors is positioned before the second group of consecutive sectors within the track, selecting the first group of consecutive sectors.

19. The method according to claim 10, wherein the read channel includes a second circuit configured to process an output signal from the read head according to a preset value of the parameter even after the new value has been determined based on the training read.

* * * * *